US005899699A

United States Patent [19]

Kamiya

[11] Patent Number: 5,899,699

[45] Date of Patent: May 4, 1999

[54] KARAOKE NETWORK SYSTEM WITH ENDLESS BROADCASTING OF SONG DATA THROUGH MULTIPLE CHANNELS

[75] Inventor: Shingo Kamiya, Hamamatsu, Japan

[73] Assignee: Yamaha Corporation, Hamamatsu, Japan

[21] Appl. No.: 08/798,649

[22] Filed: Feb. 11, 1997

Related U.S. Application Data

[63] Continuation of application No. 08/296,234, Aug. 25, 1994, abandoned.

[30] Foreign Application Priority Data

Aug. 31, 1993 [JP] Japan .................................... 5-238835

[51] Int. Cl.[6] .............................. A63H 1/28; G09B 5/08; G10H 1/26

[52] U.S. Cl. ................ 434/307 A; 434/118; 395/200.49; 348/7; 455/4.2; 84/609; 370/432

[58] Field of Search ................................ 434/307 R–309, 434/318, 365, 118; 84/477 R, 601, 603, 609, 610, 625, 630, 631, 634, 645; 369/1, 2, 4, 48, 178, 192; 360/32, 33.01, 49, 70, 72.22, 77.01; 348/7, 12–14, 473, 478, 484, 488, 563, 564, 571, 595, 723; 395/250, 200.49; 704/269; 345/141, 143, 147, 302; 381/51; 379/90, 93; 370/95.1, 95.2, 85.8, 432, 535; 340/825.03; 455/4.2, 5.1, 6.3

[56] References Cited

U.S. PATENT DOCUMENTS 3,859,596 1/1975 Jannery et al. .......................... 455/5.1
4,168,532 9/1979 Dempsey et al. .................. 395/250 X
4,882,730 11/1989 Shinmyo ................................ 370/95.2
4,958,381 9/1990 Toyoshima ......................... 370/95.2 X
5,014,125 5/1991 Pocock et al. ...................... 348/484 X
5,018,021 5/1991 Slater ................................... 455/4.2 X
5,046,066 9/1991 Messenger ......................... 370/95.2 X
5,247,126 9/1993 Okamura et al. ................... 434/307 A
5,250,745 10/1993 Tsumura ................................... 84/603
5,325,423 6/1994 Lewis .................................... 348/12 X
5,335,073 8/1994 Yamamoto .......................... 434/307 A
5,357,505 10/1994 Tsumura et al. .......................... 370/60
5,410,097 4/1995 Kato et al. ........................ 84/477 R X
5,613,192 3/1997 Ikami et al. ............................ 455/4.2
5,619,425 4/1997 Funahashi et al. ................ 395/200.49
5,654,516 8/1997 Tashiro et al. ............................ 84/610
5,689,081 11/1997 Tsurumi .................................... 84/609
5,691,494 11/1997 Sai et al. .................................. 84/609

*Primary Examiner*—Joe Cheng
*Attorney, Agent, or Firm*—Pillsbury Madison & Sutro LLP

[57] ABSTRACT

A karaoke network system is composed of a central station for serving a plurality of song data pieces, and a karaoke terminal connected to the central station through a communication network having multiple channels for selectively receiving therefrom one song data piece so as to locally present a desired karaoke song in response to a request, command. The central station includes a transmitter for sorting the plurality of song data pieces into a multiple of groups corresponding to the multiple channels to thereby transmit each group of the song data pieces successively to the corresponding channel in an endless manner. The karaoke terminal includes a receiver for selecting one of the channels designated by the request command and for picking up one song data piece specified by the same request command from the selected channel so that the karaoke terminal can present the desired karaoke song according to the picked up song data piece.

9 Claims, 5 Drawing Sheets

KARAOKE NETWORK SYSTEM WITH ENDLESS BROADCASTING OF SONG DATA THROUGH MULTIPLE CHANNELS

This is a continuation of application Ser. No. 08/296,234, filed on Aug. 25, 1994, now abandoned.

BACKGROUND OF THE INVENTION

The present invention relates to a karaoke network system constructed for serving a song data from a central station to a karaoke terminal through a communication line.

A conventional karaoke apparatus is constructed to sound an instrumental accompaniment of a requested song, which is mixed with a live vocal performance of a singer, while lyric characters of the requested song are displayed on a monitor. The conventional karaoke apparatus is classified into either of a stand-alone type and a terminal type. The stand-alone type of the karaoke apparatus is most widely spread out in the commercial market. The stand-alone type is equipped with a closed data source for storing a complete set of numerous song data required for karaoke performance in a self-support basis. However, the stand-alone type of the karaoke apparatus suffers from drawbacks such as the heavy cost of data storage and the difficulty of timely updating of song data.

On the other hand, the terminal type of the karaoke apparatus is connectable to a central station through a communication line to receive song data therefrom. This type can eliminate a closed data source which contribute to simplification of the karaoke apparatus.

A karaoke network system having the central station and the local karaoke terminals is classified into either a two-way communication type or a one-way broadcast type. In the communication type of the karaoke network system, the karaoke terminal transmits a request command to the central station through a telephone line, while the central station responds to the request command to thereby instantly transmit back requested song data to the requesting karaoke terminal. However, this communication type suffers from drawbacks such as heavy communication cost since a commercial telephone line must be called upon every request.

On the other hand, in the broadcast type of the karaoke network system, the central station successively broadcasts numerous pieces of song data in endless manner to all members of the karaoke terminals through a communication network composed of a cable line or a wireless line, while each karaoke terminal can pick up a desired one of the broadcasted song data pieces. Therefore, the karaoke terminal are free from a communication cost for two-way exchange of a request command and a corresponding song data. However, the broadcast type of the karaoke network system suffers in that the local karaoke terminal may occasionally wait for a long time until a desired song data piece is served. For example, the central station may successively broadcast a chain of 5000 song data pieces in an endless manner. In the worst case, the karaoke terminal must wait for an almost entire time length of the one complete chain if the karaoke terminal has just missed a desired song data piece in a preceding chain.

SUMMARY OF THE INVENTION

In view of the above-noted drawbacks of the prior art, an object of the invention is to allow the karaoke terminal to receive a desired song data piece with a relatively short waiting time without need of a request command to the central station in the broadcast type of the karaoke network system.

According to embodiments of the present invention, a karaoke network system comprises a central station for serving a plurality of song data pieces, and a karaoke terminal connected to the central station through a communication network having multiple channels for selectively receiving therefrom one song data piece so as to locally present a desired karaoke song in response to a request command. The central station includes transmitter means for sorting the plurality of song data pieces into a multiple of groups corresponding to the multiple of channels to thereby transmit each group of the song data pieces successively to the corresponding channel in an endless manner, and the karaoke terminal includes receiver means for selecting one of the channels designated by the request command and for picking up one song data piece specified by the same request command from the selected channel so that the karaoke terminal can present the desired karaoke song according to the picked up song data piece.

Further, according to embodiments of the present invention, a karaoke terminal apparatus connectable to a central station which broadcasts a plurality of song data pieces through al communication network having multiple channels, comprises input means for inputting a request command to request a desired karaoke song, selector means responsive to the request command for selecting one of the multiple of channels which is assigned with a chain of song data pie(es provisionally collected from the plurality of the song data pieces by the central station, to thereby receive the chain of song data pieces from the selected channel, pickup means for picking up one song data piece specified by the request command from the received chain of song data pieces, and audio synthesizer means for processing accompaniment information contained in the picked up song data piece so as to synthesize an instrumental accompaniment of the requested karaoke song.

In embodiments of the karaoke network system, the central station and the karaoke terminal are connected to each other through the multiple channels of the communication network, the channels being a wireless line such as a radio wave, or a cable line such as CATV (Cable Television) or LAN (Local Area Network). The central station transmits groups or chains of different song data pieces in parallel with the respective channels in an endless manner over a relatively short cycle. For example, the central station sorts 5000 of the entry song data pieces to form 100 of the chains so that each chain consists of 50 song data pieces. Each chain is transmitted to the corresponding channel in a cyclic manner, hence the karaoke terminal may only wait for a desired song data piece for at most one cycle period of 50 song data pieces. In practice, the one cycle can be finished within a few minutes, which may be an acceptable waiting time interval. The karaoke terminal c an simply select one channel designated by an inputted channel number, and can pick up from the selected channel a desired song data piece specified by an inputted song code; hence there is no need to transmit a request command to the central station.

DETAILED DESCRIPTION OF THE INVENTION

Figure 1:
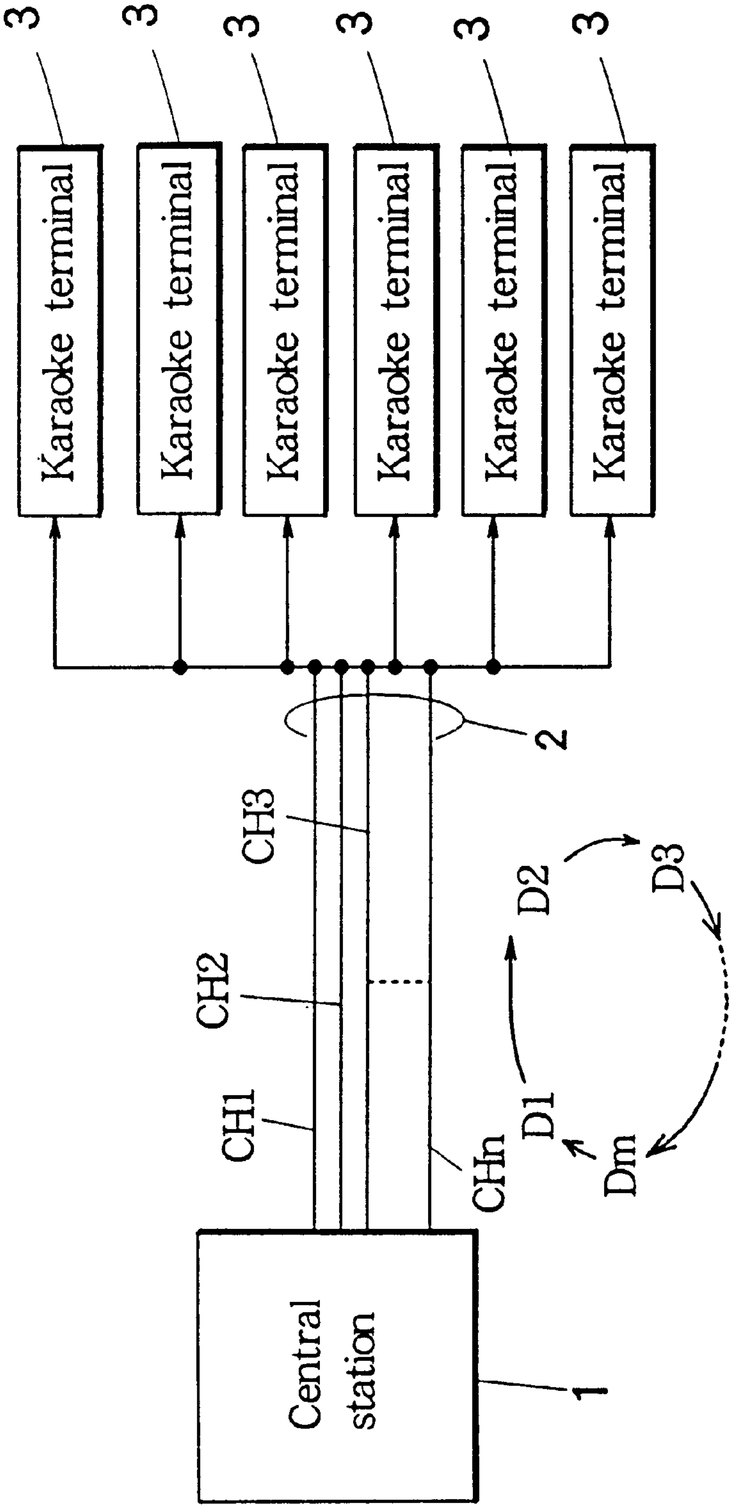
FIG. 1 is an overall block diagram showing one embodiment of the karaoke network system.

Hereinafter, preferred embodiments of the invention will be described in conjunction with the drawings. Referring to FIG. 1, the karaoke network system is comprised of a central station 1 for serving numerous song data pieces, and a plurality of karaoke terminals 3 connected to the central station 1 through a communication network composed of a wireless or cable communication line 2 for selectively receiving therefrom one song data piece so as to locally present a desired karaoke song according to a request command. The communication line 2 is provided with a multiple of channels CH1, CH2, . . . CHn by frequency division or the like. The central station 1 functions as a broadcast transmitter for provisionally sorting and dividing the numerous entry song data pieces (up to 5000) into a multiple of groups or chains corresponding to the multiple of the channels CH1–CHn to thereby transmit each group of the song data pieces D1, D2, D3, . . . , Dm to the corresponding channel in an endless manner. Stated otherwise, the central station 1 broadcasts a different endless chain of song data pieces D1–Dm in an cyclic manner through a (corresponding one of parallel channels CH1–CHn. For example, the channel number "n" is set to 100 and the song data piece number "m" of each group or chain is set to 50 so that the central station 1 can serve 5000 of the song data pieces in total.

Figure 2:
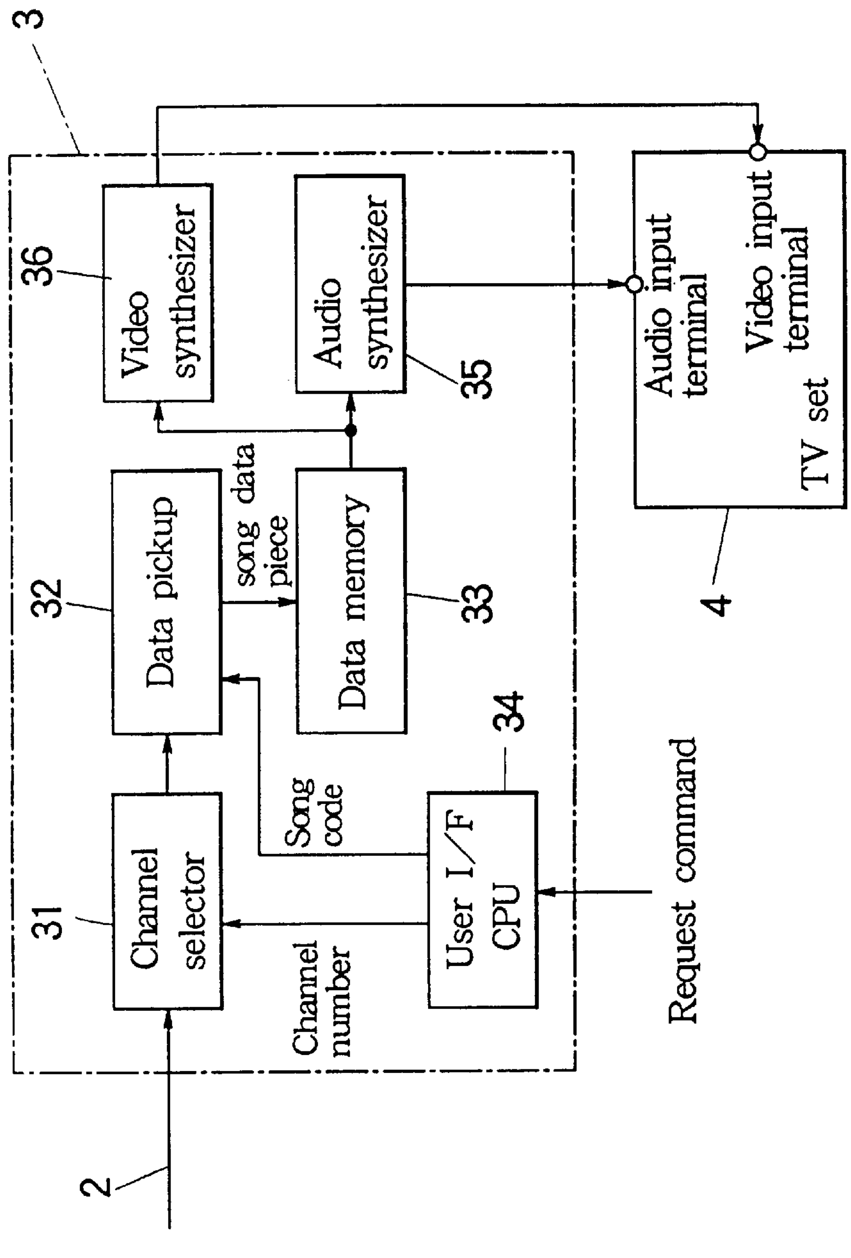
FIG. 2 is a detailed block diagram showing a karaoke terminal used with the karaoke network system.

Referring to FIG. 2, the karaoke terminal 3 is constructed as a broadcast receiver for selecting one of the channels CH1–CHn designated by the request command and for picking up one of the song data pieces D1–Dm specified by the same request command from the selected channel. Consequently, the karaoke terminal 3 can present the desired karaoke song according to the picked up song data piece. In detail, a channel selector 31 is connected to the communication line 2 for selecting one of the multiple channels CH1–CHn, which is assigned with an endless chain of song data pieces D1–Dm provisionally collected from the numerous song data pieces by the central station. A data pickup 32 is connected subsequent to the channel selector 31 for picking up one of the song data pieces D1–Dm from the selected channel. A data memory 33 is connected to the data pickup 32 for storing the picked lip song data piece which is used for presentation of the requested karaoke song.

A user interface CPU 34 is provided for enabling a player to input a request command to request a desired karaoke song. The request command indicates a combination of a channel number and a song code. In turn, the channel selector 31 selects one channel designated by the channel number, and the data pickup 32 picks up one song data piece specified by the song code. The combination of the channel number and the song code may be directly inputted as the request command. Alternatively, an initial form of the request command corresponding to a desired karaoke, song may be decoded to provide the channel number and the song code.

The song data piece may have various digital data formats such as a packet form. In this example, the song data piece contains accompaniment information in the form of a MIDI data, which can be transferred from the central station 1 at quite a fast rate so that one chain of the song data pieces call be transferred within few minutes or less for each cycle. The song data piece also contains lyric information besides the accompaniment information.

In this embodiment, an audio synthesizer 35 is provided for processing the accompaniment information contained in the picked up song data piece so as to synthesize an instrumental accompaniment of the requested karaoke song. Stated otherwise, the audio synthesizer 35 includes a tone generator for generating an audio signal according to the MIDI data, which is fed to an audio input terminal of a peripheral TV set 4. Further, a video synthesizer 36 is provided for processing the lyric information contained in the picked up song data piece so as to produce lyric characters of the request karaoke song. Stated otherwise, the video synthesizer 36 includes a font generator for generating a video signal according to the lyric information, which is fed to a video input terminal of the same TV set 4. By such a simple construction, the TV set 4 sounds the instrumental accompaniment through its built in loudspeaker, and simultaneously displays the lyric characters on its display to thereby present a basic karaoke performance of the requested song. In addition, a mixing microphone is equipped to input a live vocal performance by a player.

In a modification, a background picture is displayed on the TV set 4 in a superposed relationship to the lyric characters. The background picture may be composed of a static image or a dynamic image. The background picture may be broadcasted to the karaoke terminal from the central station. Alternatively, an image data storage medium such as a Laser Disc may be provided in the karaoke terminal. In such a case, the video synthesizer 36 is constructed to access the Laser Disc to reproduce a desired background picture associated with the requested karaoke song. In practice, the central station 1 provides the song data piece containing picture designation information effective to enable the video synthesizer 36 to reproduce a background picture from the Laser Disc in synchronism with the requested karaoke song. The picture designation information has a small data volume which does not affect the data transfer speed.

Figure 3:
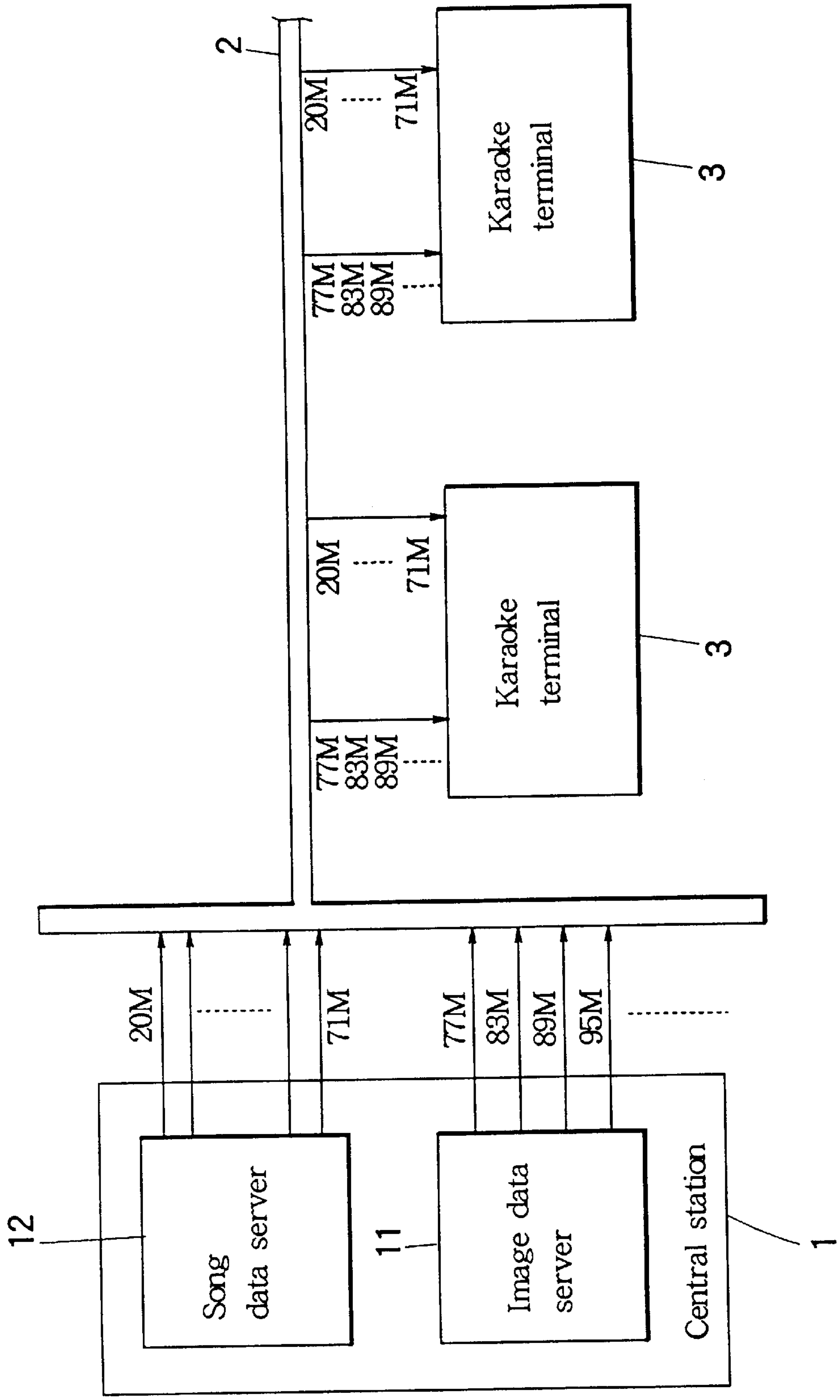
FIG. 3 is an overall block diagram showing another embodiment of the karaoke network system.

FIG. 3 shows another embodiment of the present invention in which the background picture is broadcasted to the karaoke terminal from the central station in parallel with the song data. The karaoke network system is built on a communication line 2 which utilizes a broadband transmission medium such as a coaxial cable or an optical fiber cable. A central station 1 and a group of local karaoke terminals 3 are connected to each other through the communication line 2 to constitute the karaoke network system. The communication line 2 has a plurality of channels divided into song data channels and image data channels. The central station 1 functions as a karaoke server, while each karaoke terminal is located at a desired spot to locally present a karaoke accompaniment and an associated background picture, which are served by the central station. The karaoke network system can be expanded by addition of a new karaoke terminal.

The central station 1 includes an image data server 11 and a song data server 12. The image data server 11 operates independently from the song data server 12 for transmitting to the image data channels a plurality of different image data such as different analog video signals which are continuously and simultaneously broadcasted to all of the karaoke terminals in an endless manner by one-way communication mode. On the other hand, the song data server 12 operates for transmitting to each song data channel a corresponding channel of song data in a manner similar to the previous embodiment. The song data contains accompaniment information, lyric information, designation information and the like.

As mentioned before, the communication line 2 has the plurality of channels which may be provided according to the frequency division technology. The song data channels operate for transmitting the song data from the song data server 12 of the central station 1 to each karaoke terminal 3. The image data channels operate for concurrently transmitting different items of the image data form the image data server 11 of the central station 1 to the respective karaoke terminals in a broadcast manner. In the present embodiment, communication line 2 is set up by a private communication network such as community antenna Television System (CATV) which has a broadband up to 1 GHz. In such a case, the plurality of channels are set according to frequency division as follows:

1. The song data channels

Each song data channel is assigned with an individual frequency. For example, a frequency band ranging from 20 MHz to 71 MHz is divided into about 100 channels by a pitch of 0.5 MHz so that at most 100 song data chains can be broadcasted to the respective karaoke terminals. In this embodiment, the song data is transmitted ill a packet form.

2. Image data channels

Figure 4:
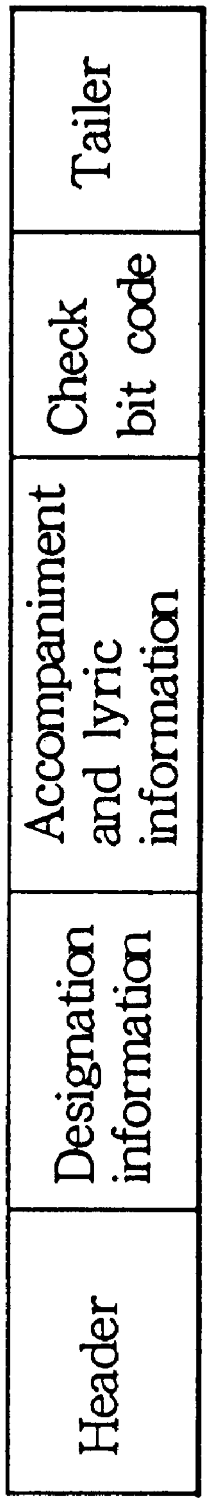
FIG. 4 is a schematic diagram showing a packet form of song data transferred in the FIG. 3 embodiment.

A frequency band ranging from 77 MHz to 1 GHz is divided by a pitch of 6 MHz to provide 150 parallel channels such that at most 150 items of image data can be served concurrently in a broadcast manner. Referring to FIG. 4, the packet from of the song data contains a serial train of designation information, accompaniment and lyric information and a check bit code, the serial train being lead by a header and being elided by a tailer. The designation information is provisionally determined to synchronize with the accompaniment and lyric information. Such a digital packet is transmitted at a high rate on the order of, for example, 5–10 M/bps. The designation information is effective to designate an image data channel which broadcasts a background picture associated to a karaoke entry song.

Figure 5:
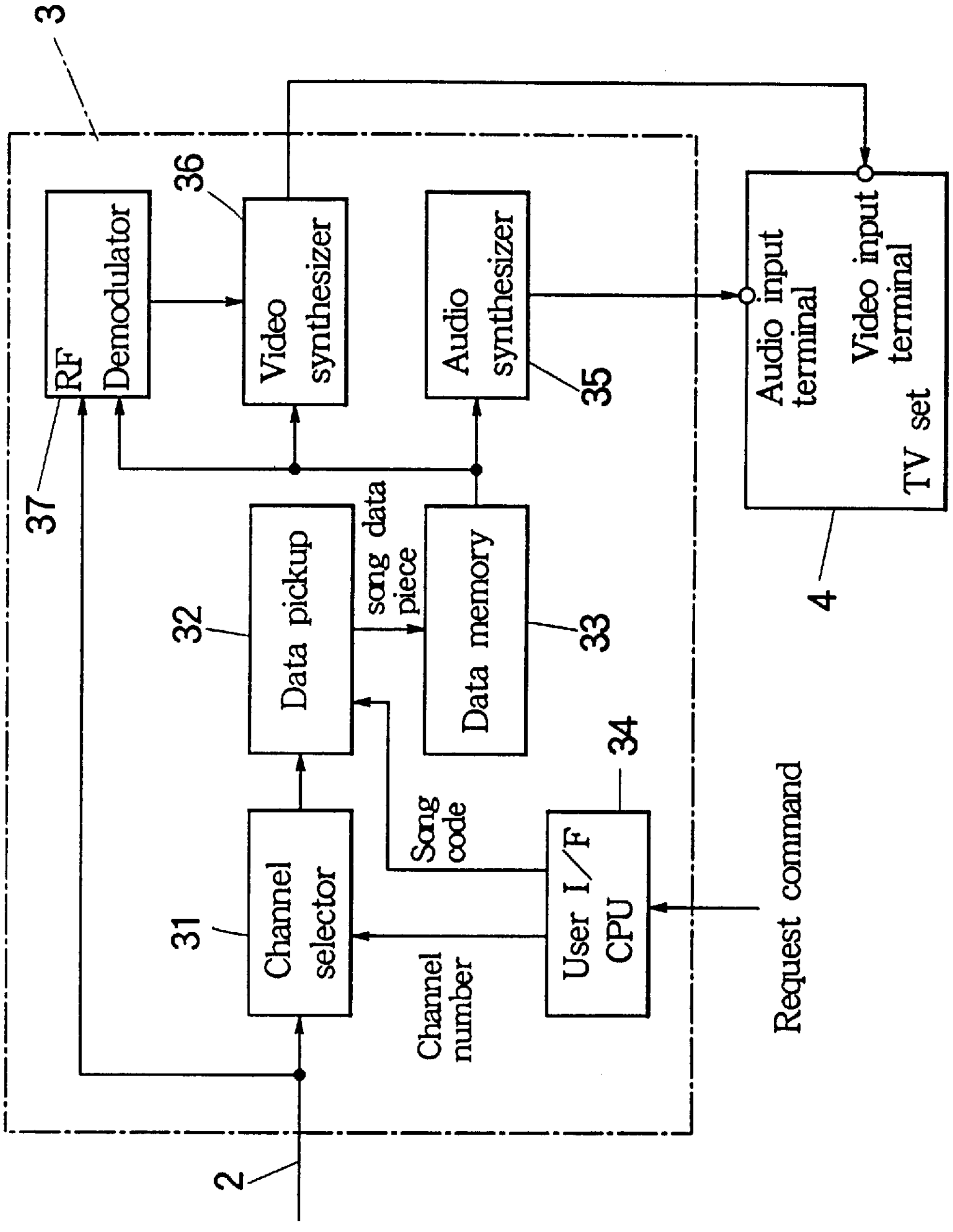
FIG. 5 is a detailed block diagram showing a karaoke terminal used with in the FIG. 3 embodiment.

FIG. 5 shows a karaoke terminal 3 involved in the FIG. 3 embodiment of the karaoke network system. The FIG. 5 karaoke terminal basically has the same construction as that of the FIG. 2 karaoke terminal. Therefore, the corresponding parts are denoted by the same references to facilitate a better understanding of the figure. An RF demodulator 37 is added to communicate with the image data channels of the communication line 2 separately from the song data channels. Namely, the data memory 33 passes the designation information contained in the song data to a selector in the form of the RF demodulator 37. Accordingly, the RF demodulator 37 selectively demodulates a particular image date broadcasted through the designated channel. The demodulated image data is fed to the video synthesizer 36 in the form of a video signal representative of a dynamic background picture. The video synthesizer 36 superposes the background picture and the lyric characters with each other, which are displayed on a CRT monitor of the TV set 4. In such an operation, the admitted song data contains the designation information which designates one of the image data channels for selecting therefrom a background picture matching with a mood of the karaoke song. Consequently, the karaoke terminal can present a background picture on the monitor display, thereby eliminating a built in video player. Further, since the central station continuously broadcasts the background pictures, the karaoke terminal does not need to wait for preparation of the image reproduction or the like.

As described above, according to embodiments the present invention, the central station and the karaoke terminal are connected to each other through multiple channels. The central station repeatedly transmits chains of different song data pieces to the respective channels, while the karaoke terminal selects one channel according to the inputted channel number and picks up therefrom a desired song data piece according to the inputted song code. By such a construction, the karaoke terminal can readily receive the desired song data piece within a practically acceptable short wait time interval without precedingly transmit a request command to the central station.

What is claimed is:

1. A karaoke network system comprising:

a central station for serving a plurality of song data pieces; and a karaoke terminal connected to the central station through a communication network having multiple channels for selectively receiving therefrom one song data piece so as to locally present a desired karaoke song in response to a local request command used in the karaoke terminal, wherein the central station includes transmitter means for sorting and dividing the plurality of song data pieces into multiple groups corresponding in number to the multiple channels to thereby transmit each group of the song data pieces successively to the corresponding channel in an endless manner, and wherein the karaoke terminal includes receiver means for selecting one of the multiple channels designated by the request command and for receiving one song data piece specified by the local request command from the selected channel so that the karaoke terminal can present the desired karaoke song according to the received song data piece.

2. A karaoke network system according to claim 1, wherein the karaoke terminal includes input means for inputting a local request command indicative of a channel number effective to designate one channel of the multiple channels and a song code effective to specify one song data piece of the plurality of song data pieces sorted and divided into one group assigned to said one channel designated by the channel number.

3. A karaoke network system according to claim 1, wherein the plurality of song data pieces are divided into the number of multiple groups corresponding to the number of channels to minimize a maximum waiting period to cycle through the entire plurality of song data pieces such that the maximum waiting period is approximately determined by a time to cycle through the entire plurality of song data pieces over a single channel divided by the number of the multiple groups.

4. A karaoke terminal apparatus connectable to a central station which broadcasts a plurality of song data pieces through a communication network having multiple channels, the apparatus comprising:

input means for inputting a local request command used in the karaoke terminal to request a desired karaoke song;

selector means responsive to the local request command for selecting one of the multiple channels which is assigned with a chain of song data pieces provisionally collected as a group from the plurality of the song data pieces by the central station, to receive the chain of the song data pieces from the selected channel;

receiver means for receiving one song data piece specified by the local request command from the received chain of the song data pieces; and audio synthesizer means for processing accompaniment information contained in the received song data piece so as to synthesize an instrumental accompaniment of the requested karaoke song.

5. A karaoke terminal apparatus according to claim 4, further comprising video synthesizer means for processing lyric information contained in the received song data piece so as to produce lyric characters of the requested karaoke song.

6. A karaoke terminal apparatus according to claim 4, further comprising memory means connected between the receiver means and the audio synthesizer means for storing the received song data piece.

7. A karaoke network system for providing a plurality of song data, the karaoke network system comprising:

a central station for serving the plurality of song data;

a communication network connected to the central station, the communication network having multiple channels for receiving the plurality of song data; and a karaoke terminal connected to the central station through the communication network to selectively receive one of the plurality of song data to present a desired karaoke song on the karaoke terminal in response to a local request command used in the karaoke terminal;

wherein the central station includes a transmitter that sorts and divides the plurality of song data into multiple groups that contain a group of the plurality of song data, the multiple groups corresponding in number to the multiple channels so that each of the multiple groups of the song data are successively transmitted in a corresponding one of the multiple channel in an continuous manner; and wherein the karaoke terminal includes a receiver that selects one of the multiple channels designated by the local request command and receives one of the plurality of song data specified by the local request command from the selected channel so that the karaoke terminal can present the desired karaoke song according to the received song data.

8. A karaoke network system according to claim 7, wherein the karaoke terminal includes an input circuit for inputting the local request command, the local request command indicating a channel number effective to designate one channel of the multiple channels and a song code that specifies one of the plurality of song data that is divided into one of the multiple groups assigned to the one channel designated by the channel number.

9. A karaoke network system according to claim 7, wherein the plurality of song data are divided into the number of multiple groups corresponding to the number of channels to minimize a maximum waiting period to cycle through the entire plurality of song data such that the maximum waiting period is approximately determined by a time to cycle through the entire plurality of song data over a single channel divided by the number of the multiple groups.

* * * * *